US007297356B2

(12) United States Patent
Macgregor et al.

(10) Patent No.: US 7,297,356 B2
(45) Date of Patent: Nov. 20, 2007

(54) METHOD FOR MANUFACTURING ANIMAL FEED, METHOD FOR INCREASING THE RUMEN BYPASS CAPABILITY OF AN ANIMAL FEEDSTUFF AND ANIMAL FEED

(75) Inventors: Charles A. Macgregor, West Point, NE (US); Mark R. Knobbe, West Point, NE (US); Ambrose J. Hugo, West Point, NE (US)

(73) Assignee: Grain States Soya, Inc., West Point, NE (US)

( * ) Notice: Subject to any disclaimer, the term of this patent is extended or adjusted under 35 U.S.C. 154(b) by 508 days.

(21) Appl. No.: 10/841,438

(22) Filed: May 10, 2004

(65) Prior Publication Data

US 2005/0255145 A1  Nov. 17, 2005

(51) Int. Cl.
A23K 1/18 (2006.01)
(52) U.S. Cl. .......................... 426/93; 426/96; 426/302; 426/615; 426/630; 426/635; 426/807
(58) Field of Classification Search .................. 426/93, 426/96, 302, 615, 630, 635, 807
See application file for complete search history.

(56) References Cited

U.S. PATENT DOCUMENTS

| | | | | |
|---|---|---|---|---|
| 2,899,307 | A | * | 8/1959 | Wilson ........................ 426/541 |
| 2,939,790 | A | * | 6/1960 | Clayton ...................... 426/630 |
| 2,968,559 | A | * | 1/1961 | Thurman .................... 426/630 |
| 2,970,910 | A | * | 2/1961 | Thurman .................... 426/662 |
| 3,469,994 | A | * | 9/1969 | Williams .................... 426/289 |
| 3,959,493 | A | | 5/1976 | Baalsrud et al. |
| 4,275,089 | A | * | 6/1981 | Kopas et al. ................ 426/601 |
| 4,393,082 | A | | 7/1983 | White et al. |
| 4,835,185 | A | | 5/1989 | Nissen |
| 5,225,230 | A | * | 7/1993 | Seaman et al. ............. 426/634 |
| 5,227,166 | A | | 7/1993 | Ueda et al. |
| 5,300,297 | A | | 4/1994 | Ueda et al. |
| 5,427,802 | A | | 6/1995 | Evans et al. |
| 5,429,832 | A | | 7/1995 | Ueda et al. |
| 5,492,694 | A | | 2/1996 | Nagaraja et al. |
| 5,637,312 | A | | 6/1997 | Tock et al. |
| 5,676,966 | A | | 10/1997 | Kitamura et al. |
| 5,703,255 | A | | 12/1997 | Weete et al. |
| 5,720,970 | A | | 2/1998 | Rode et al. |
| 5,753,223 | A | | 5/1998 | Shibahara et al. |
| 5,789,001 | A | | 8/1998 | Klopfenstein et al. |
| 5,807,594 | A | | 9/1998 | King et al. |
| 5,871,773 | A | | 2/1999 | Rode et al. |
| 6,017,530 | A | | 1/2000 | Beudeker et al. |
| 6,183,739 | B1 | | 2/2001 | Beudeker et al. |
| 6,506,423 | B2 | | 1/2003 | Drouillard et al. |
| 6,537,604 | B1 | | 3/2003 | Ethington, Jr. |
| 2002/0039619 | A1 | | 4/2002 | Monagle |
| 2002/0127259 | A1 | | 9/2002 | Orthoefer |
| 2003/0129295 | A1 | * | 7/2003 | Richardson ................ 426/635 |
| 2003/0190401 | A1 | | 10/2003 | Singh |

OTHER PUBLICATIONS

Jenkins et al., Effects of Lecithin and Corn Oil on Site of Digestion, Journal of Animal Science, 1990, vol. 68, pp. 460-466.*
Shirley et al, KSU Dairy Day 1997—pp. 28-31, Expeller Soybean Meal as a source of Rumen Undegradable Protein for Lactating Dairy Cows (1997).
Titgemeyer et. al, Journal of Dairy Science 80:714-721; Effect of Processed Grain Sorghum and Expeller Soybean Meal on Performance of Lactating Cows (1997).
Abel-Caines et al. Journal of Dairy Science 81:462-470; Effect of Soybean Hulls, Soy Lecithin, and Soapstock Mixtures on Ruminal Fermentation and Milk Composition in Dairy Cows (1998).
Shain et al, Journal of Animal Science: 71:1266-1275; Effect of a Soybean Hull:Soy Lecithin:Soapstock Mixture on Ruminal Digestion and Performance of Growing Beef Calves and Lactating Dairy Cattle (1993).
Grummer, Journal of Dairy Science 76:3882-3896—Etiology of Lipid-Related Metabolic Disorders in Periparturient Dairy Cows (1993).
Grummer, Journal of Dairy Science 74:3244-3257; Effect of Feed on the Composition of Milk Fat (1991).
Jenkins et al., Journal of Animal Science 68:460-466, Effects of Lecithin and Corn Oil on Site of Digestion, Ruminal Fermentation and Microbal Protein Synthesis in Sheep (1990).
Schwab et al., Amino Acid Balancing in the Context of MP and RUP Requirements, Department of Animal and Nutritional Sciences, University of New Hampshire, Proceedings of the Florida Ruminant Nutrition Symposium, 2004.
Michael F. Hutjens , Professor of Animal Sciences, University of Illinois, Urbana, Feed Additives in Dairy Nutrition and Management, University of Illinois' website http://www.traill.uiuc.edu/dairynet/paperDisplay.cfm?ContentID=642 (2004).
Grummer et al, Feed Additives for the Transition Cow, R. R., Department of Dairy Science, University of Wisconsin, Manitowoc County Extension, Proceedings of the Tri-State Dairy Management Conference, 2001.
Piepenbrink et al., Rumen-protected choline for transition dairy cows, Department of Animal Science, Cornell University, Cornell Seminar for Feed Dealers, 1999.
Bryan Miller International Dairy Topics, vol. 2, No. 6, Transition cows—potential roles for methionine, 2003.

(Continued)

Primary Examiner—C. Sayala
(74) Attorney, Agent, or Firm—Sughrue Mion Pllc.

(57) ABSTRACT

An animal feed that comprises a feedstuff and a coating, where the coating increases the amount of the feedstuff that passes through the rumen without being degraded by the rumen microflora, thereby delivering a larger portion of that feedstuff's associated preformed protein, and the essential amino acids comprising that protein, to the lower gastrointestinal tract. A process for making an animal feed, where the animal feed has enhanced rumen bypass nature of feed ingredients and their associated nutrients, particularly preformed protein and the amino acids that comprise the protein. Methods of increasing the rumen bypass of phosphatidylcholine, methods of increasing the vitamin E value of a feedstuff, methods for increasing rumen escape of the protein and amino acids in a ruminant animal.

26 Claims, 1 Drawing Sheet

OTHER PUBLICATIONS

Thomas R. Overton, Healthy Livers Make for Healthy Cows, Advances in Dairy Technology, vol. 13, p. 169, 2001.

Overton et al., Liver Metabolism and the Transition Cow, T. R. Department of Animal Science, Proceedings of Cornell Nutrition Conference, pp. 118-127, 1999.

Charles Macgregor, Ph.D., PAS, Soy Best, The Progressive Dairy-Man, Heat-treated, screw press soybean meal, Oct. 2003.

Charles Macgregor, Ph.D., PAS, Technical Bulletin, The Economics of Bypass Amino Acids, Soy Best, Oct. 2003.

Kirk-Othmer, Encyclopedia of Chemical Technology, Third Edition, vol. 14, Lecithin, pp. 250-269, 1978.

Perry Alasti, VP, Food Processing Technologies, *Artisan Rototherm Dries Lecithin*, Bulletin 0202, Artisan Industries Inc., estimated Feb. 2002.

Charles Macgregor, Ph.D., PAS, Research News—Rumen-Bypass Amino Acids in Three Branded Products, SoyBest, Jun. 1, 2004.

Charles Macgregor, Ph.D., PAS, Research News—Soy Best . . . Now it's Rumen-Protected with Lecithin, Soy Best, Apr. 2004.

Charles Macgregor, Ph.D., PAS, Research News—New-Process Soy Best Supplies More Bypass Protein in Total Mixed Rations, Soy Best, Jul. 2004.

Piepenbrink et al., Liver Metabolism and Production of Cows Fed Increasing Amount of Rumen-Protected Choline During the Periparturient Period. Journal of Dairy Science, 86:1722-1733, 2003.

Michael F. Hutjens, Feed Additives, Dairy Nutrition Management, Veterinary Clinics of North America: Food Animal Practice—vol. 7, No. 2, Jul. 1991, pp. 525-540.

\* cited by examiner

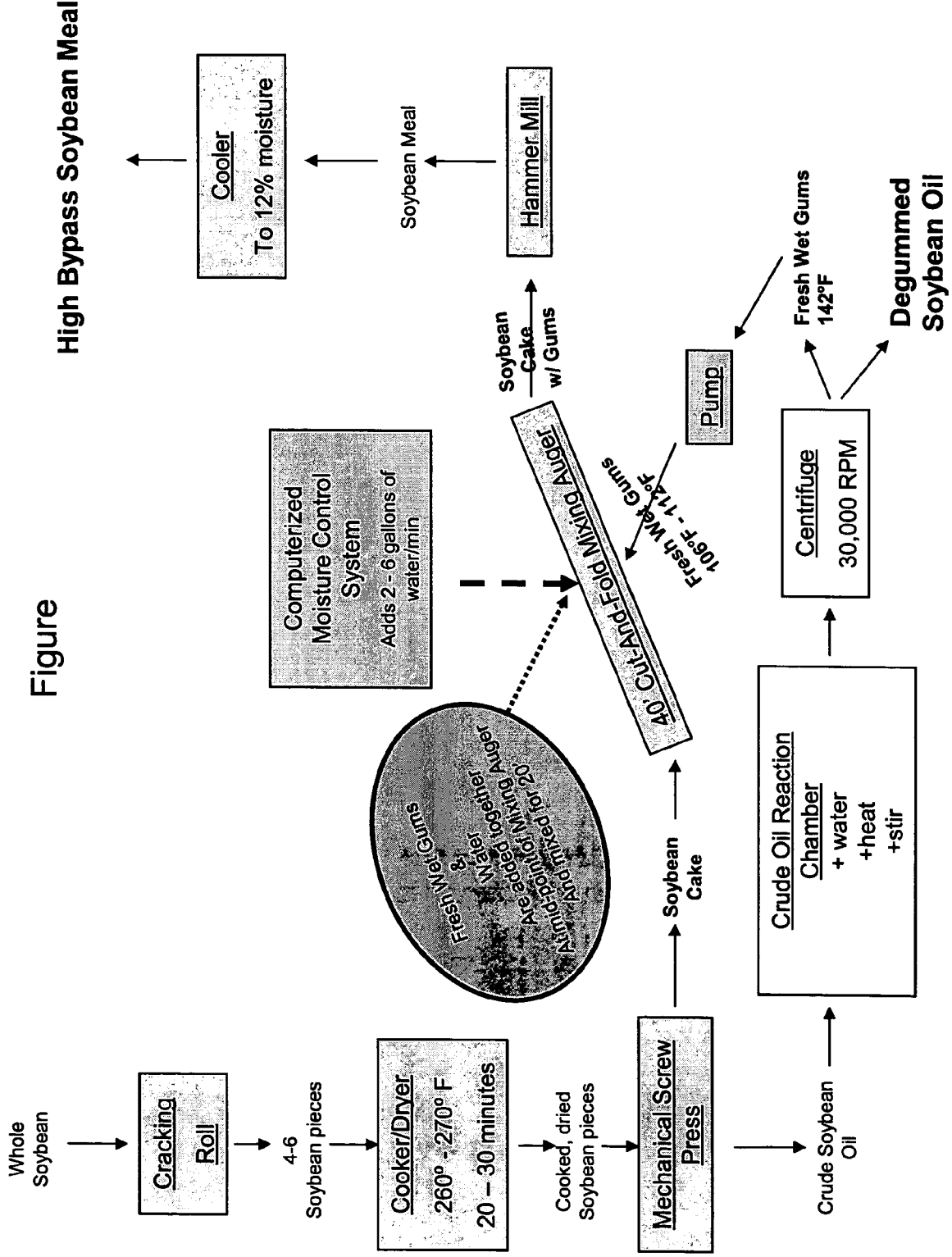

METHOD FOR MANUFACTURING ANIMAL FEED, METHOD FOR INCREASING THE RUMEN BYPASS CAPABILITY OF AN ANIMAL FEEDSTUFF AND ANIMAL FEED

BACKGROUND OF THE INVENTION

1. Field of the Invention

The present invention relates to an animal feed and a process for making an animal feed, where that animal feed has enhanced rumen bypass nature of feed ingredients and the nutrients supplied by those ingredients, particularly preformed protein and the amino acids that comprise the protein. The animal feed comprises a feedstuff and a coating, which is designed to be applied to the feedstuff for the purpose of increasing the amount of that feedstuff that passes through the rumen without being degraded by the rumen microflora, thereby delivering a larger portion of that feedstuff's associated preformed protein, and the essential amino acids comprising that protein, to the lower gastrointestinal tract.

The present invention also includes methods of increasing the rumen bypass of phosphatidylcholine, methods of increasing the vitamin E value of a feedstuff, methods for increasing the rumen bypass of protein and amino acids in a ruminant animal and an animal feed comprising a cake coated with a coating derived from wet gums.

A ruminant is an animal which possesses a complex stomach consisting of morphologically distinct compartments. In ruminant animals like cattle or sheep, there is a problem that occurs when a biologically active substance is, for instance, orally administered: a substantial part of the substance (e.g., proteins, amino acids, etc.) are decomposed to ammonia or carbon dioxide gas or other gases by microorganisms in the rumen, making it difficult or impossible for the animal to effectively utilize all of the administered proteins and amino acids contained in feed, etc. A ruminant only receives the benefit of a portion of the nutrients fed to it and loses a portion which may be excreted in urine or feces. Thus, due to anaerobic microbial fermentation in the rumen, the original nutritive value of feedstuffs can be reduced prior to digestion and absorption of the nutrients contained in those feedstuffs in the lower gastrointestinal tract of ruminants. This is particularly true of the preformed protein fraction in feedstuffs and the amino acids that comprise that protein.

Ruminants have biological requirements for essential amino acids. It is common practice in ruminant production to supply amino acids in the daily diet in the form of preformed protein in naturally occurring vegetable feedstuffs. A certain amount of the protein in a feedstuff, including the nonessential amino acids and the essential amino acids which comprise the protein in the feedstuff, can be destroyed by microbial fermentation in the rumen. Those essential amino acids that are destroyed are rendered unavailable for animal production. Animal production is limited by the supply of individual essential amino acids that escape, or bypass, the rumen intact and reach the lower gastrointestinal tract where they can be absorbed and become available for animal production.

The reticulorumen is the first of several digestive organs through which ingested feedstuffs pass after being consumed by a ruminant. The rumen is populated by numerous species of bacteria and protozoa which are collectively referred to as rumen microflora. The microflora attack and degrade organic matter (feedstuff) that enters the rumen. By means of this destructive activity, the amount of essential amino acids reaching the lower gastrointestinal tract can be less than the amount of those same essential amino acids that comprised the preformed protein in the feedstuff that was originally consumed.

When inadequate amounts of essential amino acids escape the rumen, the ruminant's production of milk and meat, as well as reproduction, are all negatively affected.

2. Description of Related Art

There are numerous methodologies that are designed to increase the amount of a nutrient that passes through the rumen without being degraded by the rumen microflora, thereby delivering a larger portion of that nutrient to the lower gastrointestinal tract.

U.S. Pat. No. 3,959,493 to Baalsrud et al. describes utilizing aliphatic fatty acids having at least 14 carbon atoms each. The fatty acids are applied as a coating to an individual nutrient. The fatty acids are said to be resistant to rumen degradation. The active agents then are delivered to the abomasum and/or intestine where the fatty acids are reduced in that post-ruminal environment.

U.S. Pat. No. 5,714,185 to Mahadevan describes treating protein substances with zein/formaldehyde to render the ingredients protected from rumen degradation. However, with regard to its impact on the nutritional quality of animal food products such as milk, the public has a negative perception of the use of formaldehyde in animal diets.

U.S. Pat. No. 5,093,128 to Draguesku et al, describes a beadlet nutrient coating which includes fats and calcium based products. U.S. Patent Application 20020127259 to Orthoefer indicates that coated ruminant nutrients are disadvantageous due to cracking or abrading either in handling or in being masticated by the animal.

The University of Nebraska (Shain, et al, *Effect of a Soybean Hull:Soy Lecithin:Soapstock Mixture on Ruminal Digestion and Performance of Growing Beef Calves and Lactating Dairy Cattle, Journal of Animal Science*, 71:1266-1275, 1993) discloses the use of lecithin as an energy source in rations for dairy cattle. The lecithin was mixed with soy soap stock and with soybean hulls. This was done to make the lecithin practical to handle in a mixing system. Shain, et al does not disclose increasing rumen-bypass of protein (soap stock and soy hulls are low in protein). They demonstrated the "rumen-protected fat" characteristic of lecithin when used as an ingredient in the ration. Shain, et al does not disclose to coat an ingredient for the purpose of rendering the amino acids in that ingredient less subject to destruction in the rumen, before that ingredient was mixed into a ration.

The "rumen-protected fat" characteristic of lecithin has been noted in research at the University of Wisconsin (Gummer, *Effect of Feed on the Composition of Milk Fat, Journal of Dairy Science*, 74:3244-3257, 1991) and at Clemson University (Jenkins and Fotouchi, *Effects of Lecithin and Corn Oil on Site of Digestion, Ruminal Fermentation and Microbial Protein Synthesis in Sheep, Journal of Animal Science* 68:460-466, 1990). The lecithin was used as an ingredient in the ration. It was not used to coat an ingredient, rendering that ingredient less subject to destruction in the rumen, before that ingredient was mixed into a ration.

U.S. Pat. No. 5,227,166 to Ueda et al discloses a feed additive for ruminants comprising a core containing a biologically active substance and coating composition placed on the surface of the core. The coating composition comprises lecithin, at least one inorganic substance which is stable in neutrality and soluble under acidic conditions, and at least one substance selected from the group consisting of straight-chain or branched-chain saturated or unsaturated monocarboxylic acids having 14 to 22 carbon atoms, salts thereof, hardened vegetable oils, hardened animal oils, and waxes.

BRIEF SUMMARY OF THE INVENTION

It is an object of this invention to provide an animal feed, which is augmented so that it enhances the ability of feedstuff, along with the protein the feedstuff contains and the amino acids comprising the protein, to pass through the rumen with a reduction in the extent of degradation by the rumen microflora.

The present invention is based on the discovery that the application of fresh gums from a seed or grain oil, when applied to a feedstuff, results in an increase in the amount of that feedstuff's protein that passes through the rumen without being degraded by the rumen microflora. The effect is to increase the proportion of the feedstuff's protein, along with the nonessential and essential amino acids comprising that protein, that bypasses the rumen without being degraded.

The characteristic rumen bypass value for the protein in soybean meal can be increased by the use of the present invention. The application of wet gums to that soybean meal results in a rumen bypass value for the protein of 73%. That represents an increase in the amount of protein escaping rumen degradation of twenty-one percent, due to the addition of the wet gums.

Wet gums provide a "rumen protected" characteristic. The rumen is one of a cow's digestive organs and is followed by the omasum, the abomasum and the small intestines. A feestuff coated with wet gums tends to pass through the rumen without being degraded. After escaping the rumen, the feedstuff may be digested in the lower gut.

The rumen-bypass nature of the present invention is important for at least three reasons. Phosphatidylcholine, Methionine-Sparing Effect, and Increase Rumen-Bypass of Essential Amino Acids.

Phosphatidylcholine.

The wet gums contain lecithin which contains phosphatidylcholine (PC). PC is necessary for mobilization of fat out of the liver. If this process is impeded due to inadequate dietary PC, fat will accumulate in the liver, causing a reduction in feed consumption, a reduction in milk yield, an increase in health problems and a reduction in breeding performance. This represents an economic loss to dairy producers.

Fat is mobilized out of the liver in the form of very-low-density-lipoprotein (VLDL). This requires PC. VLDL is necessary for synthesis of milk fat. Inadequate dietary PC will reduce VLDL, which will reduce milk fat yield. This represents an economic loss to dairy producers.

Methionine-Sparing Effect.

If dietary PC is deficient, dietary methionine can be used to synthesize the needed PC. This is a bad thing. Methionine is essential for the production of milk protein. Any diversion of methionine away from milk protein production to PC synthesis is an economic loss to the dairy producer. Research has shown that as much as 28% of methionine can be diverted to PC production in diets that are deficient in PC.

Methionine is typically the first-limiting amino acid in dairy rations. Methionine is expensive. The present invention provides a source of rumen-bypass methionine. The wet gums provide a methionine-sparing value.

Increase Rumen-Bypass of Essential Amino Acids

By coating the particles of a meal, such as soybean meal, the wet gums enhance the bypass nature of the particles. This reduces the amount of destruction experienced by essential amino acids in the soybean meal during transit through the rumen. This results in more essential amino acids reaching the small intestine where they can be absorbed. As a result, the cow is able to produce more milk protein. That is an economic benefit to dairy producers.

The animal feed of the invention, when fed to dairy cattle, tends to spare dietary methionine for milk protein production. The animal feed of the invention, when fed to dairy cattle, tends to supply more rumen-bypass essential amino acids for milk production. The animal feed of the invention, when fed to dairy cattle, tends to support the synthesis of milk fat and milk protein. Production of milk fat and milk protein by dairy cows benefits dairy producers economically.

Additional Benefits.

Phosphatidylcholine can be deficient in dairy rations. When phosphatidylcholine is deficient, milk fat synthesis is reduced and dietary methionine can be diverted from its role in milk protein production to the production of phosphatidylcholine. That is an economic loss to dairy producers. The animal feed of the invention, which increases the amount of phosphatidylcholine to the diet can reduce that loss.

The present invention adds wet gums to a feed ingredient in such a manner that the wet gums are stabilized. This is a practical way of supplying a cow with phosphatidylcholine.

The present invention also renders a feed ingredient more rumen-bypass in nature. By applying the wet gums to a feed ingredient, that ingredient becomes more resistant to degradation in the rumen.

The animal feed of the present invention is a good source of essential amino acids for milk production and renders those essential amino acids more available for milk production.

The conventional thinking in the scientific community is that dietary choline is destroyed in the rumen. Overton, *Healthy Livers Make for Healthy Cows, Advances in Dairy Technology*, Volume 13, page 169 (2001). However, by use of the present invention, 30% of phosphatidylcholine (choline ester of orthophosphoric acid) bypasses the rumen without being destroyed.

Bypass Protein

The rumen bypass value for the protein in soybean meal that has been produced from soybeans that are heated (200-300° F.) for a period of time (10-80 minutes) and mechanically expelled through a screw press was measured at 58.3% (Dr. Terry Klopfenstein, University of Nebraska, Institute of Agriculture and Natural Resources, Animal Sciences Department) and at 61.7% (Dr. Michael McCormick, Louisiana State University, Agricultural Center, Southeast Research Station) for an average value of 60%.

However, by the use of the present invention, the application of wet gums to that soybean meal results in a rumen bypass value for the protein of 73%. That represents an increase in the amount of protein escaping rumen degradation of twenty-one percent, due to the addition of the wet gums according to the procedures of the present method.

Bypass Methionine, Lysine, Histidine and Threonine

The rumen-bypass rates of methionine, lysine, histidine and threonine have been measured at the Rumen Profiling Laboratory, West Virginia University. Their rates are consistent with the increased protein bypass rate associated with the addition of wet gums in the present invention.

Methionine-Sparing Effect

The mobilization of triglycerides from a cow's liver for the purpose of producing milk fat requires phosphatidylcholine (PC). Insufficient dietary PC impedes this mobilization and causes a build up of fat and ketone bodies in the liver. That, in turn, leads to reduced feed intake, reduced milk yield and difficulty breeding back.

When the supply of PC is inadequate to meet demand, the cow can use methionine to synthesize more PC (both are methyl donors). Research has shown that as much as 28% of metabolizable methionine can be shunted to synthesis of PC when PC is deficient. This can reduce milk protein production (methionine is an essential amino acid for milk production).

The Protein bypass, Methionine bypass, Lysine bypass, Histidine bypass And Threonine bypass are summarized in the Table below:

| | |
|---|---|
| Protein Bypass, % of total: | 73.34 |
| Methionine Bypass, % of total: | 78.40 |
| Lysine Bypass, % of total: | 69.79 |
| Histidine Bypass, % of total: | 68.49 |
| Threonine Bypass, % of total | 71.03 |

The soybean animal feed of the present invention contains 0.6% phosphatidyl choline. 30% of that phosphatidylcholine passes through the rumen without being destroyed (rumen-bypass).

2 pounds of the soybean animal feed supplies 1.6 grams of bypass phosphatidylcholine.

As the choline ester of orthophosphoric acid, phosphatidylcholine contains 40% choline.

Therefore, 2 pounds of the soybean animal feed supplies 0.65 g of absorbable choline.

1 choline spares 4.4 metabolizable methionines.

Therefore, 2 pounds of the soybean animal feed can spare 2.8 grams of metabolizable methionine.

BRIEF DESCRIPTION OF THE DRAWINGS

The FIGURE is an example of the process of the present invention using soybeans as the seed and/or grain.

DETAILED DESCRIPTION OF THE INVENTION

DETAILED DESCRIPTION

One embodiment of the present invention is a process for making an animal feed of the invention comprising:
fracturing a seed and/or grain into pieces;
heating the seed and/or grain pieces;
extracting crude oil from the seed and/or grain pieces to produce a cake and the crude oil;
separating the crude oil into wet gums and a degummed oil; and
coating the wet gums on the cake to form the animal feed. The term "coating" includes the wet gums soaking into or absorbing into the cake.

The seed and/or grain pieces may be any type of seed or grain, for example, oilseeds, grains, beans, sunflower seeds, peas, canola seeds, soybeans, peanuts, cottonseeds, safflower seeds, sesame seeds, linseed seeds, corn, wheat, barley, sorghum, alfalfa, and mixtures thereof.

Soybeans are a preferable type of starting material.

The process may be started with whole seeds and/or grains. The whole seeds and/or grains are fractured into pieces. This may be done by any known process, such as by passing the seeds and/or grains through one or more cracking rolls to fracture the hulls and break up the seeds and/or grains. This process can also be used to remove the outer layer of the seeds and/or grains before the oil is extracted from the beans. A separator or sorter, such as a cleaner or aspirator, may also be used to separate the hulls from the seeds and/or grain pieces, prior to the cracker.

The seed and/or grain pieces are then treated with a heat regimen. For example, heated in a cooker/dryer to heat and dry the seed and/or grain pieces. In the cooker/dryer a temperature of 200 to 300 F., preferably, 260 to 270 F. may be used to heat the seed and/or grain pieces for 10 to 80 minutes, preferably, 20 to 30 minutes. The heat treatment helps to reduce the solubility of the proteins contained in the feed in the rumen.

The crude oil is extracted from the heat-treated seed and/or grain pieces. Mechanical extraction (screw press, "expeller") or solvent extraction, such as with hexane as a solvent may be used. The mechanical extraction is a preferable method. The use of no hexane is preferable. In particular, using mechanical extraction allows for an all-natural process, where only heat and pressure are utilized and no chemicals are utilized.

The extraction process results in two products: crude oil and cake. The cake is a feedstuff that is typically used as a feedstuff by others after being reduced in size by a hammer mill.

The cake is typically hot and goes directly to the mixing auger. In texture it consists of 5% meal (pieces 1-5 millimeters) and 95% larger pieces. The larger pieces range in size from 3"×5"×¼" to 5"×14"×¼".

The crude oil is separated into wet gums and degummed oil by heating and stirring with the addition of water in a reaction chamber, and then separated by centrifugation. The degumming may be by a continuous water and centrifugation process. The crude oil enters the "reaction chamber." Water and heat are added and the mixture is stirred. The mixture is then centrifuged to separate the gums from the oil. The mixture then passes to a centrifuge and, for example, is spun at 30,000 revolutions per minute. The centrifugation process causes the gums to separate from the oil, resulting in degummed oil and fresh gums. If the "reaction chamber" step is eliminated, the yield of gums by centrifugation is reduced.

The gums separated from the crude oil contains phospholipids, triglyceride, diglyceride, monoglyceride, free fatty acid, linoleic acid, linolenic acid, palmitic acid, stearic acid, oleic acid, lecithin, phosphatidylinositol, phosphatidylethanolamine, phosphatidylserine, phosphatidic acid, phosphatidylcholine, and lyso phosphatidylcholine.

The gums are then applied onto the cake. Preferably the gums are applied onto the cake while the gums are still wet, warm and fresh, creating cake coated with gums. That is, the gums are not allowed to dry and are not cooled to ambient temperature prior to coating on the cake. Likewise, the cake entering the mixer from the crude oil extraction process is also still warm and fresh.

Any mixing process may be used to coat the wet gums on the cake. Preferably, the coating is performed in a mixer with the addition of water. The water helps to disperse the gums so that more of the cake is "treated" with gums. An example of a mixer is a cut-and-fold mixing auger.

The cake may be added to the mixer prior to the addition of the wet gums and water.

The wet gums may be at a temperature of above 100° F. when added to the mixer. The wet gums may be at a temperature of from 106° to 112° F. when added to the mixer.

The temperature of the water that is added to the mixer at the mid-point of the mixing auger is at least 45° F., preferably 45° to 60° F.

The gums are applied to the cake at the rate of up to 50% by weight of the cake. For example 0.1% to 10.0% by weight to the cake. A preferable method to apply the gums to the cake is at a rate of 0.1% to 5% by weight. The cake may be fully or partially coated.

The cake coated with gums is generally still hot when leaving the mixer. The gums and water have been thoroughly absorbed into the cake. There is no loose water.

In an embodiment of the present invention, all of the gums that are extracted from all of the oil that is extracted from the beans is placed on all of the meal that is produced from the beans. In another embodiment, the tendency of this process to increase rumen bypass of protein, amino acids and phosphatidyl-choline can be further enhanced by the application of additional gums which can be obtained from another de-gumming operation.

After leaving the mixer, the cake coated with gums may be broken into smaller particles of a desired size or formed into desired shapes. The resulting cake coated with gums is also called meal with gums. The meal with gums is cooled to ambient temperature (for example, in a cooler). The cooling to ambient temperature stabilizes the meal with gums.

An additional embodiment of the present invention is the use of process control feedback to control the moisture content of the meal with gums. In this embodiment, the moisture content of the meal with gums is monitored. The monitoring may be after the cooler. This information is used to control the moisture content of the meal with gums by controlling the amount of water added to the mixing step where the cake is coated with wet gums. The control may be manual or by automatic control. A computerized system may also be used, such as a Dantec Computerized Moisture Control System (DANTEC SYSTEMS CORP 495 Dotzert Ct., Waterloo, Ontario N2L 6A7, Canada).

Generally, the amount of water added to the coating step in the mixer is from 2 to 6 gallons/minute based on 200 to 400 pounds of cake per minute.

The moisture content of the animal feed is typically controlled to be 10-12.5% moisture by weight. Preferably, the moisture content of the animal feed is 12% moisture and the protein content of said animal feed is at least 42.0%.

In addition to a method of making animal feed and the resulting animal feed, the present invention also includes:

A method for increasing the rumen bypass capability of an animal feedstuff, comprising coating said animal feedstuff with a coating, then feeding to the animal, wherein said coating comprises phosphatidylcholine, phospholipids, triglyceride, diglyceride, monoglyceride, free fatty acid, linoleic acid, linolenic acid, palmitic acid, stearic acid, oleic acid, lecithin, phosphatidylinositol, phosphatidylethanolamine, phosphatidylserine, phosphatidic acid, phosphatidylcholine, and lyso phosphatidylcholine, and wherein the rumen bypass nature of at least protein, amino acid, and phosphatidylcholine are increased relative to said feedstuff alone;

A method for increasing the rumen bypass capability of an animal feed where methionine, phosphatidylcholine, protein, lysine, histidine and/or threonine are increased relative to said feedstuff alone;

A method for increasing the rumen bypass capability of an animal feedstuff, comprising coating said animal feedstuff with a coating, then feeding to the animal, wherein said coating comprises phosphatidylcholine, crude protein, non-protein nitrogen, detergent fiber, ash, fat, sugar and starch, and wherein the rumen bypass nature of at least one component selected from the group consisting of protein, amino acid, and phosphatidylcholine are increased relative to said feedstuff alone;

An animal feed comprising soybean cake coated with a coating derived from soybean wet gums, wherein said coating derived from soybean wet gums comprises phosphatidylcholine, phospholipids, triglyceride, diglyceride, monoglyceride, free fatty acid, linoleic acid, linolenic acid, palmitic acid, stearic acid, oleic acid, lecithin, phosphatidylinositol, phosphatidylethanolamine, phosphatidylserine, phosphatidic acid, phosphatidylcholine, and lyso phosphatidylcholine; and An animal feed comprising soybean cake coated with a coating derived from soybean wet gums, wherein said coating derived from soybean wet gums comprises phosphatidylcholine, crude protein, non-protein nitrogen, detergent fiber, ash, fat, sugar and starch.

Additional feed additives, such as vitamins, amino acids, including essential amino acids, additives and supplements may also be added to the animal feed, including the cake and the coating.

Example Process with Soybeans

The FIGURE is an example of the process of the present invention using soybeans as the seed and/or grain. As shown in the FIGURE, whole soybeans are fractured into 4 to 6 pieces using a Cracking Roll. The soybean pieces are heated in a Cooker/Dryer for 20 to 30 minutes at from 260 to 270 F. The cooked, dried soybean pieces are pressed in a Mechanical Screw Press to extract crude oil from the soybean pieces. The hot soybean cake from the screw press is fed into a 40 foot cut-and-fold mixing auger. A cake-breaker (not shown) may be located immediately after the screw press to reduce the cake down to 3"×5"×¼" pieces on average.

The crude oil extracted from the soybean pieces is fed into a Crude Oil Reaction Chamber where it is stirred with water and heat. Next, the crude oil is Centrifuged at 30,000 RPM to separate the fresh wet gums yielding a degummed soybean oil.

In one sample, the gums separated from the crude oil contained 22.7% moisture, 77.3% dry matter, 3.7% crude protein, 0.1% non-protein nitrogen as % protein, 0.1% acid detergent fiber, 0.2% neutral detergent fiber, 7.46% ash, 60.78% fat by acid hydrolysis, 4.1% total sugars as invert, 0.69% starch.

The fresh wet gums are pumped to the Mixing Auger where they are added, together with water, at the 20 foot point of a 40 foot Cut-and-Fold Mixing Auger. The temperature of the water that is added at the mid-point of the mixing auger is 56° F. The temperature of the fresh wet gums is 106° F. to 112° F. when they are added to the Mixing Auger.

The temperature of the cake is 170-220° F. measured between the press and the auger. The temperature of the cake as it moves through the Mixing Auger is 100° F. to 115° F. At the end of the Mixing Auger, the texture of the soybean cake is 15% meal (pieces 1-5 millimeters) and 85% larger pieces. The larger pieces are typically 3"×5"×¼" in size on average.

The gums and water have been thoroughly absorbed into the soybean cake. There is no loose water.

The amount of water added to the Mixing Auger is controlled by a DANTEC Moisture Control System. The DANTEC Moisture Control System monitors moisture level in the soybean meal after the cooler/dryer. The amount of water is controlled to 2 to 6 gallons per minute on cake moving at 200 to 400 pounds per minute.

The hot soybean cake coated with gums is broken up into smaller pieces, also called soybean meal. The soybean meal is cooled and dried to 12% by weight moisture in a Cooler.

EXAMPLES

Feed Sample 1

Feed Sample 1 was a soybean feed sample of the present invention. Feed Sample 1 was ground to provide a better surface area for phospholipid extraction. The ground sample was sent to Avanti Polar Lipids, Inc., Analytical Services Division, Alabaster, Ala., for analysis of phospholipids by HPLC. Approximately 20.6 grams of the ground Soybean Meal were suspended in 100 ml of 10% NaCl in water and emulsified. The emulsion was extracted with 150 ml of 1.1 (v/v) chloroform:methanol and centrifuged. The lower chloroform layer was removed to a separate 250 ml volumetric flask. The remaining methanol:water layer was extracted twice with 50 ml of chloroform and combined with the initial extract. The chloroform extract solution was brought to volume with additional 1.1 (v/v) chloroform:methanol. HPLC was performed by a normal phase gradient utilizing a mixture of authentic soy phospholipid standards.

The standard mixture contained phosphatidylinositol (PI), phosphatidylethanolamine (PE), phosphatidylserine (PS), phosphatidic acid (PA), phosphatidylcholine (PC) and lyso phosphatidylcholine (LPC). This mixture was injected at multiple volumes to achieve a 5 level calibration curve to encompass the potential concentrations of phospholipids in the soy sample. Table 1 reports the amounts of each phospholipids measured in the sample expressed as mg of phospholipid per gram of material.

TABLE 1

| Lipid amount expressed in mg/gm. | |
|---|---|
| Liquid Compound | Ground Soybean Mean (Grain) |
| P1 | 1.91 |
| PE | 1.71 |
| PS | ND |
| PA | 0.61 |
| PC | 6.07 |
| LPC | ND |
| Total | 10.3 |

ND = none detected above limit of quantitation for compound.
PA reported below LOQ of 1.52 mg/gm for information only.

Live Cow Analysis

Feed Sample 2 was a soybean feed sample of the present invention. Feed Sample 2 was incubated in the rumen of a fistulated Holstein cow for sixteen hours. (Rumen Profiling Laboratory, West Virginia University). The cow was in early lactation and producing 80 pounds of milk daily. Feed Sample 2 was a soy material of the present invention.

Result: 30% of the phosphatidylcholine in the soybean feed sample of the present invention escaped rumen degradation after sixteen hours of exposure in the rumen of a Holstein cow producing 80 lbs. of milk. This confirms the rumen-protected nature of this important methyl donor.

Rumen Bypass Protein:

A soybean feed sample of the present invention was evaluated for rumen bypass protein, expressed as a percent of total protein. Without added gums, 60% of protein escaped rumen degradation (rumen bypass). With added gums, 73% of protein escaped rumen degradation (rumen bypass).

Vitamin E Testing

A soybean feed sample of the present invention was tested for levels of tocopherols (vitamin E) (Eurofins, Woodson-Tenent Laboratories Division) and compared with a soybean meal, solvent extracted (3.3 mg Vitamin E/kg (Dale and Batal, University of Georgia/Feedstuffs)) and a soybean meal, expeller (6.6 mg Vitamin E/kg (Dale and Batal, University of Georgia/Feedstuffs)).

The soybean feed sample of the present invention contained five times more Vitamin E (16.4 mg Vitamin E/kg) than hi-protein soybean meal (solvent extracted) and 2½ times more than traditional expeller soybean meal (screw press).

While the present invention has been described in detail and with reference to specific embodiments thereof, it will be apparent to one skilled in the art that various changes and modifications can be made therein without departing from the spirit and scope thereof. The presentation of specific examples are demonstrative only and are not intended to be limiting. Likewise, the presentation of preferable embodiments and conditions are not intended to be limiting.

What is claimed is:

1. A process for making an animal feed comprising:
   fracturing a seed and/or grain into pieces;
   heating said seed and/or grain pieces;
   extracting crude oil from said seed and/or grain pieces to produce a cake and said crude oil;
   separating said crude oil into fresh wet gums and a degummed oil; and
   coating said fresh wet gums on said cake to form the animal feed,
   wherein coating is performed by adding said flesh gums, said cake, and water to a mixer in which said fresh wet gums are at a temperature above 100° F., the cake is at a temperature of 100 to 115° F., and water is added at a temperature of at least 45° F.,
   wherein the rate at which at least one of protein, amino acid and phosphatidyl-choline of said animal feed bypass the rumen intact and reach the lower gut is increased over that of animal feed made from said cake without coating with said wet gums.

2. The process for making an animal feed of claim 1, wherein said seed and/or grain comprises soybeans.

3. The process for making an animal feed of claim 2, wherein at least some of the hulls are removed prior to fracturing into pieces.

4. The process for making an animal feed of claim 1, wherein said heating is at a temperature of 260 to 270° F. for 20 to 30 minutes.

5. The process for making an animal feed of claim 1, wherein said crude oil is extracted from said seed and/or grain pieces by a mechanical press.

6. The process for making an animal feed of claim 1, wherein said crude oil is separated into said wet gums and said degummed oil by heating and stirring with the addition of water and ten centrifugation.

7. The process for making an animal feed of claim 1, wherein said coating is conducted in a mixer wit the addition of water.

8. The process for making an animal feed of claim 7, wherein said coating is conducted in a cut and fold mixing auger with said cake added prior to the addition of said fresh wet gums and water.

9. The process for making an animal feed of claim 7, wherein said fresh wet gums are at a temperature of from 106° to 112° F. when added to said mixer.

10. The process for making an animal feed of claim 1, wherein said fresh wet gums are not allowed to dry prior to coating on said cake.

11. The process for making an animal feed of claim 1, further comprising monitoring the moisture content of the animal feed and controlling the moisture content of the animal feed.

12. The process for making an animal feed of claim 7, further comprising monitoring the moisture content of the animal feed and controlling the moisture content of the animal feed by controlling the amount of water added to said mixer.

13. The process for making an animal feed of claim 12, wherein the amount of water added to said mixer is from 2 to 6 gallons/minute based on 200 to 400 pounds of cake per minute.

14. The process for making an animal feed of claim 11, wherein the moisture content of the animal feed is controlled to be 10-12.5% moisture.

15. The process for making an animal feed of claim 14, wherein the moisture content of the animal feed is controlled to be 12% moisture.

16. The process for making an animal feed of claim 1, further comprising breaking the coated cake.

17. The process for making an animal feed of claim 1, further comprising cooling the coated cake to ambient temperature.

18. The process for making an animal feed of claim 2, wherein the protein content of said animal feed is at least 42.0%.

19. The process for making an animal feed of claim 1, further comprising additional wet gums to supplement said fresh wet gums.

20. A method for increasing the rumen bypass of at least one of protein, amino acid and phosphatidyl-choline in a ruminant animal comprising feeding animal feed formed from the process of claim 1 to a ruminant animal.

21. The method for increasing the rumen bypass capability of an animal feed of claim 20, wherein the vitamin E value of the feedstuff is increased.

22. A method for increasing the rumen bypass capability of an animal feedstuff, comprising coating said animal feedstuff with a coating while the coating is wet, warm and fresh, then feeding to the animal,
   wherein said coating comprises phosphatidylcholine, phospholipids, triglyceride, diglyceride, monoglyceride, free fatty acid, linoleic acid, linolenic acid, palmitic acid, stearic acid, oleic acid, lecithin, phosphatidylinositol, phosphatidylethanolamine, phosphatidylserine, phosphatidic acid, phosphatidylcholine, and lyso phosphatidylcholine,
   wherein the rumen bypass nature of at least one component selected from the group consisting of protein, amino acid, and phosphatidylcholine is increased relative to said feedstuff alone, and
   wherein the coating is a gum.

23. The method for increasing the rumen bypass capability of an animal feed of claim 22, said at least one component is at least one selected from the group consisting of methionine, phosphatidylcholine, protein, lysine, histidine and threonine.

24. A method for increasing the rumen bypass capability of an animal feedstuff, comprising coating said animal feedstuff with a coating while it is warm, wet and fresh, then feeding to the animal,
   wherein said coating comprises phosphatidylcholine, crude protein, non-protein nitrogen, detergent fiber, ash, fat, sugar and starch, and wherein the rumen bypass nature of at least one component selected from the group consisting of protein, amino acid, and phosphatidylcholine are increased relative to said feedstuff alone, and
   wherein the coating is a gum.

25. An animal feed comprising soybean cake coated with a coating derived from soybean wet gums, wherein the soybean cake is coated with The soybean wet gums while the soybean wet gums are wet, warm and fresh, and wherein said coating derived from soybean wet gums comprises phosphatidylcholine, phospholipids, triglyceride, diglyceride, monoglyceride, free fatty acid, linoleic acid, linolenic acid, palmitic acid, stearic acid, oleic acid, lecithin, phosphatidylinositol, phosphatidylethanolamine, phosphatidylserine, phosphatidic acid, phosphatidyicholine, and lyso phosphatidylcholine.

26. An animal feed comprising soybean cake coated with a coating derived from soybean wet gums, wherein the soybean cake is coated with the soybean wet gums while the soybean wet gums are wet, warm and fresh, and wherein said coating derived from soybean wet gums comprises phosphatidylcholine, crude protein, non-protein nitrogen, detergent fiber, ash, fat, sugar and starch.

* * * * *